United States Patent [19]

Endo et al.

[11] 4,311,876

[45] Jan. 19, 1982

[54] ROUTE GUIDANCE SYSTEM FOR ROADWAY VEHICLES

[75] Inventors: Hiroshi Endo, Yokosuka; Kousaku Baba, Yokohama; Akira Matsumura, Yokosuka, all of Japan

[73] Assignee: Nissan Motor Company, Ltd., Yokohama, Japan

[21] Appl. No.: 893,601

[22] Filed: Apr. 3, 1978

[30] Foreign Application Priority Data

Apr. 6, 1977 [JP] Japan .................. 52-38577

[51] Int. Cl.³ .............................. H04B 1/66
[52] U.S. Cl. .......................... 179/15.5 ST; 370/109
[58] Field of Search ............ 325/53, 55, 64, 4, 31, 325/6, 16, 117; 340/23, 24, 147 PC, 312; 179/15.5 ST, 15 AC; 370/109

[56] References Cited

U.S. PATENT DOCUMENTS

| | | | |
|---|---|---|---|
| 2,429,607 | 10/1947 | Capen | 343/100 |
| 3,757,290 | 9/1973 | Ross | 340/23 |
| 3,947,807 | 3/1976 | Tyler | 340/23 |
| 3,991,485 | 11/1976 | Golenski | 340/23 |
| 4,009,375 | 2/1977 | White | 340/23 |

FOREIGN PATENT DOCUMENTS

| | | |
|---|---|---|
| 2214770 | 3/1972 | Fed. Rep. of Germany . |
| 2428028 | 1/1976 | Fed. Rep. of Germany . |
| 2066014 | 8/1971 | France . |

OTHER PUBLICATIONS

*Telemetry, the Road Map of the Future,* Charles D. LaFond, *Electronic Design* 12, Jun. 7, 1969, pp. 25, 26.

*Primary Examiner*—David L. Stewart
*Attorney, Agent, or Firm*—Lowe, King, Price & Becker

[57] ABSTRACT

A central station of a route guidance system collects traffic data from various points of a city area and updates aural routing information stored in roadside remote stations at periodic intervals. A moving vehicle senses the location of a roadside station to transmit a coded destination signal thereto where it is decoded to retrieve desired routing information. The latter is compressed in time dimension and transmitted back to the vehicle for storage in a storage device which is later retrieved at such a rate as to reproduce the original aural information.

19 Claims, 11 Drawing Figures

ROUTE GUIDANCE SYSTEM FOR ROADWAY VEHICLES

BACKGROUND OF THE INVENTION

The present invention relates to a route guidance system for vehicle drivers in response to an inquiry given at specified locations.

There has been a growing need for the solution of the problem of traffic congestion. To cope with this problem, proposals have been made to establish a route guidance system in which a central computer and a plurality of remote stations are provided. The remote stations are located at various points of a metropolitan area to send traffic data to the central computer. Upon receiving the traffic data, the computer processes the data to provide routing information. One prior art approach, as disclosed in United States patent application No. 735,746 filed Oct. 26, 1976, now abandoned, the voice of an inquiring vehicle driver is compressed in time dimension and transmitted over a microwave link to a nearby remote station and thence to the central station where the time-compressed aural inquiry information is expanded in time dimension to reproduce the driver's voice. An attendant in charge of the system hears the reproduced voice and then consults the computer to provide routing information which is returned to the driver. In returning the routing information, the attendant voice is time-compressed and transmitted in a short interval of time to the vehicle where the received signal is time-expanded for reproduction. Although this prior art system allows the drivers to inquire every kind of information, such as the information they need in traffic accidents, a great number of attendants are required to constantly monitor the system's input signals. Furthermore, because of the human intervention, it takes long for the driver to exchange information and requires two communication equipments to provide a bothway communication; one for the transmission of the inquiry signal and the other located ahead of the first equipment to receive the routing information.

SUMMARY OF THE INVENTION

The principal object of the invention is to provide a route guidance system for moving vehicles which permits them to intercommunicate on a real-time basis without human intervention in response to an inquiry signal.

According to the invention, a number of predetermined items of aural routing information are stored in specified locations of storage medium located in a central station. The stored routing information is retrieved at predetermined intervals and transmitted to remote stations in response to the collected traffic data. The remote station is equipped with a data storage system in which the transmitted aural routing information is stored. The stored data is automatically updated in response to the varying traffic data. The remote stations are located alongside of roadways and each provided with means for establishing a bothway electromagnetic communication link with a moving vehicle when it enters a specified area of the roadway. The vehicle unit is provided with a destination encoder, a storage system and means for establishing the bothway communication link with the roadside station. The inquiry information is keyed into the destination encoder which translates the input signal into a train of binary digits representing the destination of the vehicle. Upon entering the specified area of the roadway, the bothway communication link is established and the destination code is transmitted to the roadside station, which decodes the destination code to determine the location of a desired piece of routing information. The latter is retrieved from the roadside storage unit and transmitted in an interval much smaller than the time the original aural information will be later reproduced for human intelligibility, i.e. the aural routing information is time-compressed to such a degree that the vehicle can receive it before it leaves the specified communication area in which only one vehicle is permitted to communicate with the system. The time-compressed routing information is stored in the vehicle storage system and later retrieved at a rate much lower than the rate it has previously been stored.

For the purpose of achieving time-compression of the aural routing information, the latter is preferably quantized into a stream of binary pulses prior to the storage in the roadside digital storage system. The quantization permits the information to be stored with high packing density and retrieval at a rate almost 100 times higher than the rate at which the routing information is reproduced. A dual-rate clock source is provided which responds to a signal from the central station by driving the digital storage system at a low clock rate to update the storage contents and responds to the received destination code from the moving vehicle by unloading the stored quantized data at a high rate for transmission. A plurality of such digital devices are provided for each piece of routing information. PCM encoding may be the most preferred method of quantization because of its immunity to noise. The quantized signal must be dequantized to recover the original aural information, and if the quantized signal is a PCM signal, dequantization is, of course, a process of PCM decoding.

The route guidance system of the invention involves transmission of voice and data information over a data communication network. For distributing the routing information to the remote stations, district stations may be provided as repeater stations connected in an intermediate hierarchical level between the central station and the remote stations. The remote station can be divided into a roadside unit and a plurality of lane units which are associated with respective lanes of a roadway to provide bothway communication with the moving vehicles.

BRIEF DESCRIPTION OF THE DRAWINGS

The invention is further described in greater detail with reference to the accompanying drawings, in which.

DETAILED DESCRIPTION

Figures 1, 2:
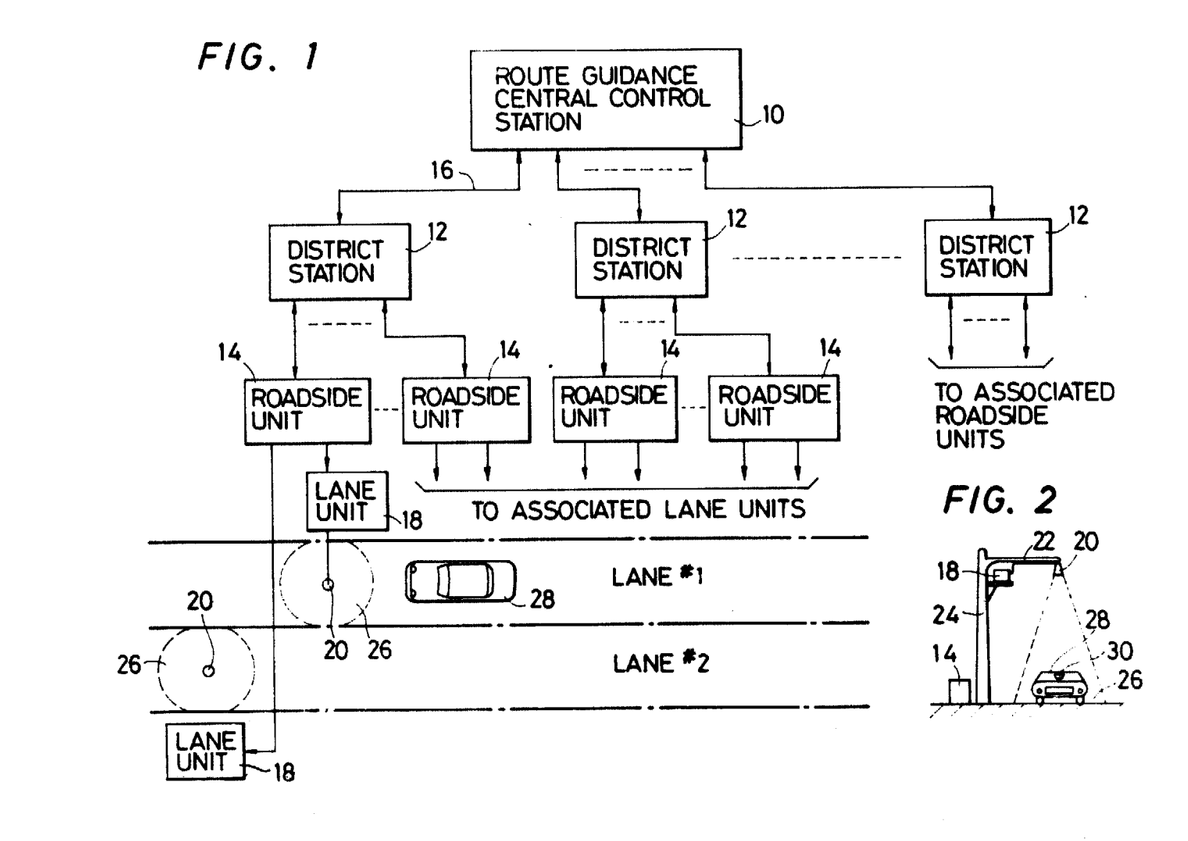
FIG. 1 is an illustration of the general configuration of the route guidance system according to the invention.
FIG. 2 is an illustration of a vehicle shown communicating with a roadside unit of FIG. 1.

The route guidance system of the invention represented in FIG. 1 comprises generally a central control station 10, a plurality of district stations 12 and a plurality of roadside units 14, all of which are connected via bothway data and voice communication networks and arranged in an hierarchical order. The central station 10 is equipped with a central computer (not shown) which monitors various traffic data collected from the roadside units 14 and gives an indication of optimum routes which vehicles should take, to console attendants. Many pieces of aural routing information, approximately a 10-second duration apiece, are pre-roaded in specified locations of a storage medium and automatically retrieved at predetermined intervals in response to the collected traffic data and sent to desired roadside units. The routing information is preceded by a channel selection signal generated by the computer, which the district station uses to determine to which roadside unit the routing information should be sent. Each roadside unit is connected to a plurality of lane units 18 each being associated with a respective one of lanes No. 1 and No. 2 (only two lanes are shown for simplicity). The routing information so received by the roadside unit is transferred to its associated lane unit or units where the aural information is stored for later retrieval.

The lane unit 18 is provided with a microwave antenna 20 mounted on an end of a projecting arm 22 of a pole 24 so as to direct microwave energy downward to define a radiated area 26 (see FIG. 2). As seen in FIG. 1 the antennas 20 associated with respective lane units are mounted in positions which are offset with respect to each other in the direction of the lanes so that the radiated areas 26 do not overlap each other to avoid interference and at such a height from the road surface as to cover an area in which only a single vehicle 28 is permitted to communicate with the route guidance system. The vehicle 28 is provided with a microwave antenna 30 pointed upward to direct electromagnetic energy to and receive transmitted energy from the lane antenna 20 while the vehicle is within the communication area 26.

Each of the district stations 12 comprises a small-size computer (not shown) which is programmed to process the incoming selective information on a real-time basis for transmission of the aural routing information to a desired roadside unit. As will be described later, each of the roadside units is likewise comprised of a minicomputer to handle the received information so that the system including the central station, district stations and roadside units can be basically described as constituting an on-line data communication network.

The selective information transmitted from the district station to a roadside unit 14 is used to determine the storage location of the associated routing information in the lane unit 18.

Figure 3:
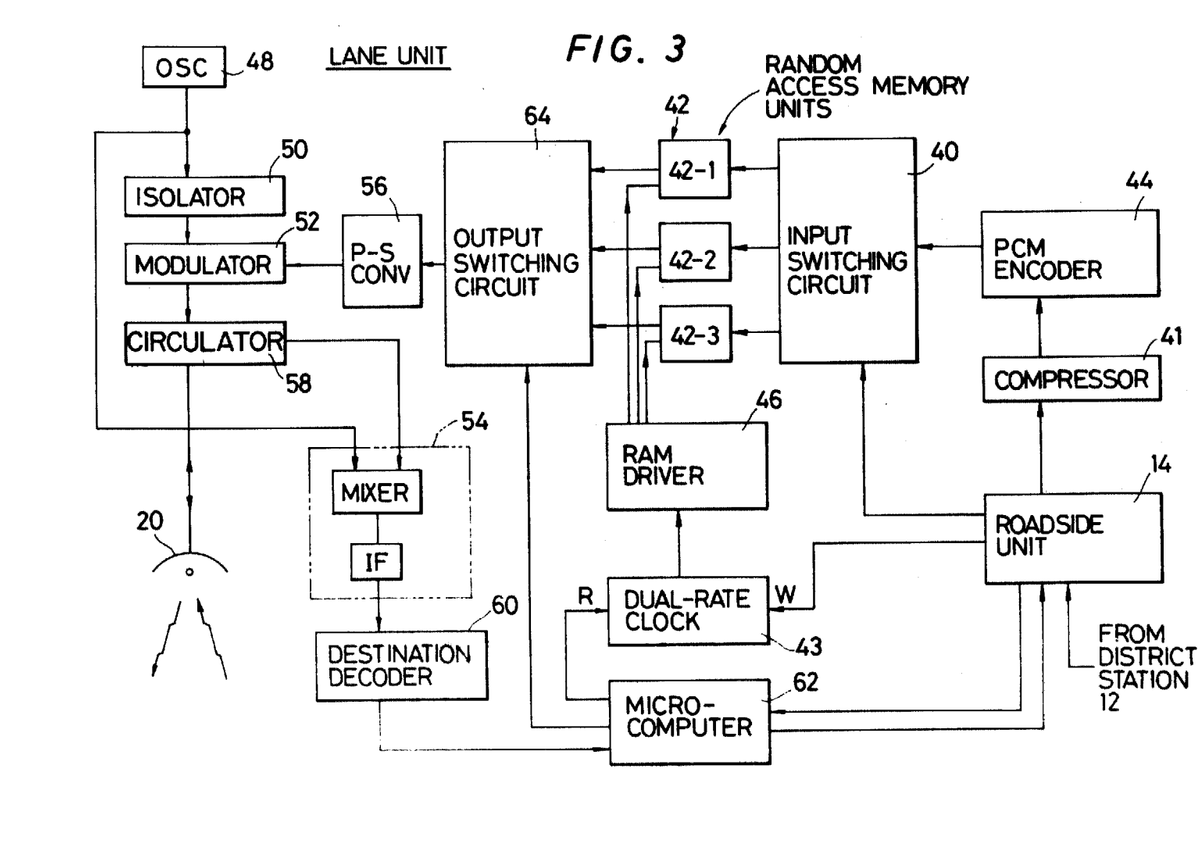
FIG. 3 is a schematic illustration of a lane unit of FIG. 1.

In FIG. 3, the channel selection data transmitted from the associated district station 12 is fed into the roadside unit 14 which decodes the received data to select one of a plurality of input gates 40 of the lane unit 18. The aural routing information successively transmitted from the district station immediately after the selection data is applied to a PCM compressor 42 and thence to a PCM encoder 44. As is well known in the art, the effect of the compressor 42 is to reduce the volume range of the input audio frequency signal such that weak signal components are made stronger while the stronger signal components are reduced in strength so that the system is rendered immune to quantum noise inevitably generated in the process of quantization in the encoder 44. In the conventional manner, the encoder 44 samples the input analog signal at predetermined intervals, and the analog value or height of the sampled signal is then represented by the presence or absence of each binary position of a train of six binary pulses. The PCM encoded pulses are then transferred from the encoder 44 in parallel form to one of a plurality of random access memory units 42 through an input channel in a switching circuit 40 selected in response to the channel selection signal received at the roadsise unit 14.

In response to the channel selection data, the roadside unit 14 activates a dual-rate clock source 44 which causes an RAM driver 46 to drive the selected RAM unit at such a rate that the memory cells of the selected RAM unit are accessed in sequence in synchronism with the sampling rate of the PCM encoder 44. The transferred PCM coded pulses are thus stored in parallel six bits. The lane unit 18 is thus ready to accept a signal from a moving vehicle passing under the antenna 20.

Microwave energy is generated from oscillator 48 which couples it through an isolator 50 to an amplitude modulator 52 on the one hand and to a demodulator 54 on the other hand as a road oscillator signal. The modulator 52, in the absence of a signal from a parallel-serial converter 56, feeds an unmodulated microwave energy through a circulator 58 to the antenna 20 so that the moving vehicle can detect the presence of the zone 26 by sensing the unmodulated microwave energy.

Figure 4:
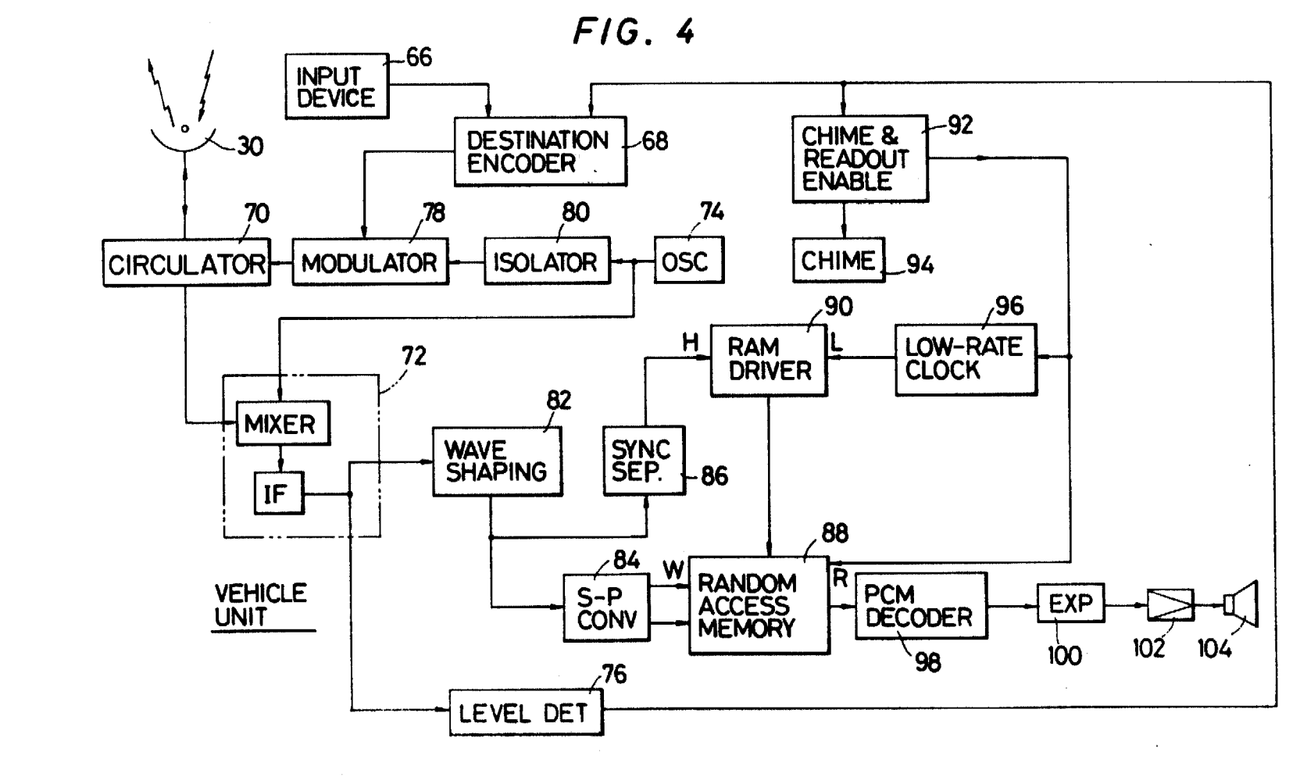
FIG. 4 is a schematic illustration of a vehicle unit mounted in vehicles of FIG. 1.

Referring to FIG. 4 in which the vehicle unit is illustrated in schematic form, the vehicle driver manipulates a data input device 66 prior to the time the vehicle 28 enters the communication zone 26. The data input device 66 may comprise a pluarlity of thumbwheels (not shown) arranged on a front panel and accessible by the drive to generate a combination of voltages to specify the destination of the moving vehicle and feeds the voltage combinations to a destination encoder 68 which translates it into a binary code. The microwave energy from the lane antenna 20 is received by antenna 30 and fed through a circulator 70 to a demodulator 72 to which is also applied a local oscillation from a microwave oscillator 74. The demodulated output is applied to a level detector or voltage sensor 76 which provides an output when the received microwave energy exceeds a predetermined threshold level. Upon the vehicle entering the zone 26, level detector 76 provides an output and signals the destination encoder 68 to send the destination code in the form of a series of 15 binary pulses to an amplitude modulator 78 to which the oscillator output is also applied via isolator 80. The microwave energy is thus modulated in accordance with the pulses of the destination code and transmitted via circulator 70 and antenna 30 and through the atmosphere to the lane antenna 20. In a practical embodiment, a typical value of the time necessary to transmit the 15-bit destination code is 16 microseconds.

Referring back to FIG. 3, the microwave energy transmitted from the vehicle unit is captured by antenna 20 and fed into the demodulator 54 via circulator 58 to recover the original destination code, which is in turn applied to a destination decoder 60, the latter converting the received signal into a parallel form for application to a microcomputer 62. In the roadside unit 14, the selection data which has previously been used to activate input gate is stored as a destination code to determine correspondence with the destination code the vehicle unit has transmitted. The computer 62 compares the received destination code from decoder 60 with the destination code previously stored in the roadside unit 14 and generates an output to indicate which one of output gates 64 is to be activated. Simultaneously, the dual-rate clock source 44 is activated by the computer 62 to cause the RAM driver 46 to drive the RAM units to initiate reading of the stored information at a clock rate a hundred times higher than the clock rate at which the information is stored. The stored information is read out non-destructively in succession in six-bit parallel form. The activated output switching circuit 64 allows only those data contained in a selected one of the RAM units 42 to be passed therethrough to the parallel-series converter 56. Specifically, each of the RAM units 42-1, 42-2, and 42-3 has a storage capacity of typically $2^{16}$ bits. During this reading operation, the memory cells of the selected RAM unit is addressed at intervals of 1.66 microseconds, whereas during the writing operation the selected memory cells are addressed at intervals of 166 microseconds. At intervals of 1.66 microseconds, the addressed memory cells deliver the stored binary information to the converter 56 in parallel six bits to convert them into a series of six bits with a synchronization or frame bit inserted between successive six-bit pulse streams and feeds to the modulator 52 for modulating the amplitude of the microwave carrier. In this way the aural routing information is time-compressed to within a period of approximately 100 milliseconds and transmitted through microwave communication link to the vehicle unit so that the routing information is transmitted before the vehicle leaves the communication zone 26.

Referring again to FIG. 4, the time-compressed digital routing information is demodulated and applied to a waveshaper 82 and thence to a serial-parallel converter 84 and to a sync separator 86. The output of the converter 84 is thus a replica of the signal derived from the output switching gates 64 and applied along with a write enable signal to a storage device 88 such as random access memory, charge-coupled device or bucket brigade device, to permit temporary storage of the time-compressed binary infromation for later retrieval therefrom to accomplish time expansion. The synchronization bit contained in the received bit stream is separated by the sync separator 86 and applied as a high-rate clock to a random access memory driver 90 to cause it to drive the storage system 88 to write the received data in parallel six-bit form in step with the separated synchronization bit. The storage device 88 is thus loaded with the routing information prior to leaving the communication zone 26.

Figures 5, 6:
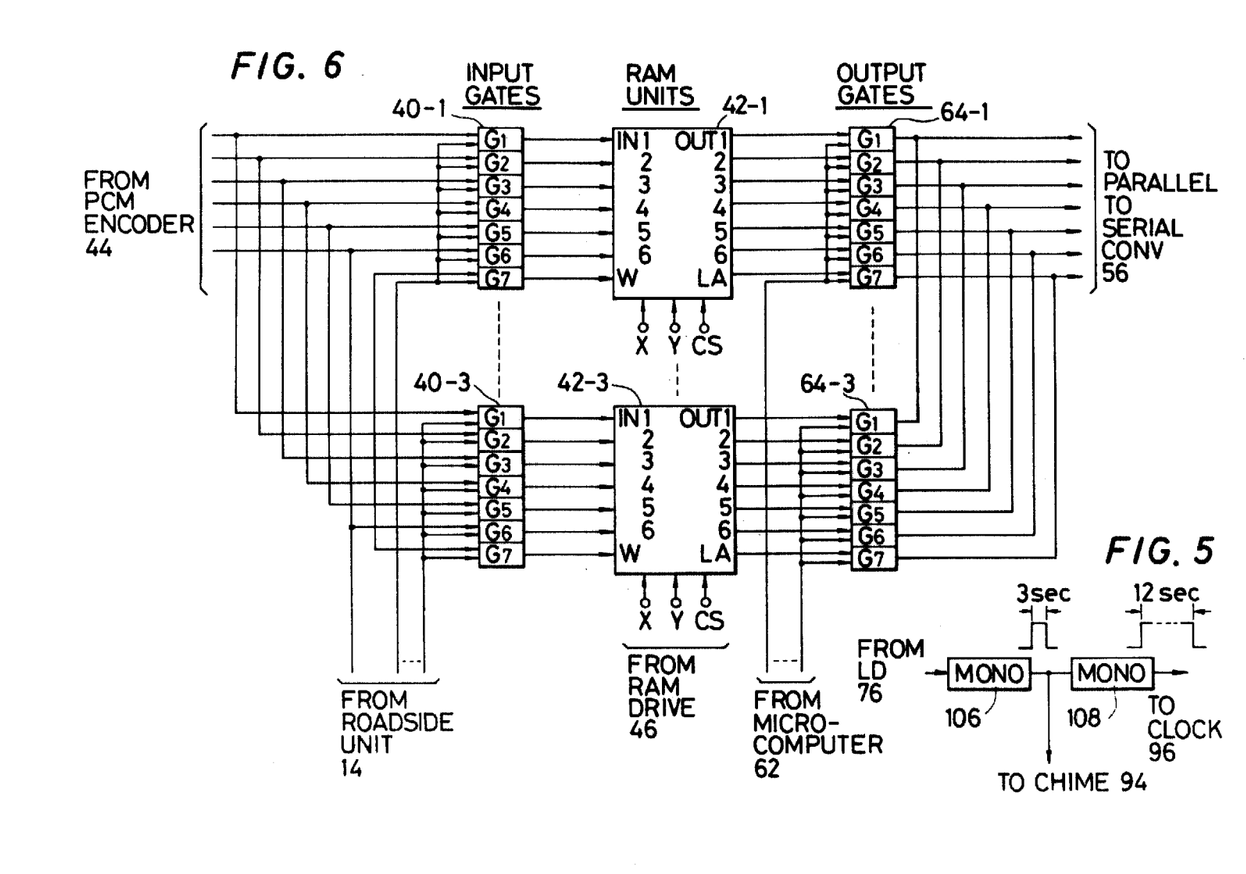
FIG. 5 shows the details of a readout enable circuit of FIG. 4.
FIG. 6 shows the details of a storage system of FIG. 3.

A chime-and-readout enable circuit 92 is provided to be responsive to the output from the level detector 76 which remains active until the vehicle 28 leaves the zone 26. The enable circuit 92 comprises, as shown in FIG. 5, monostable multivibrators 106 and 108 connected in series between the output of level detector 76 and the input of a low-rate clock source 96 and also to the storage device 88. Upon detection of zone 26 by level detector 76, the monostable 106 is activated to produce a pulse of 3-second duration which is applied to a chime 94 to give aural indication to the vehicle driver that the vehicle unit is ready to give the aural routing information which it has just received and stored in its memory. The monostable 108 detects the trailing edge of the 3-second pulse to generate a 12-second pulse which is used to enable the low-rate clock 96 and the storage device 88. For achieving time expansion, the RAM driver 90 is driven at a clock interval of 166 microseconds by the clock source 96 to clock out the stored digital information to a PCM decoder 98 to recover the original audio frequency signal, the latter being applied to an expander 100 to expand its volume range in a manner reverse to that performed by the compressor 42 of the lane unit 14, and thence to a loudspeaker 104 through an amplifier 102. The aural routing information is thus given in succession to the chime during a 12-second period which is approximately 100 times longer than that taken to transmit and receive the time-compressed signal.

Figure 7:
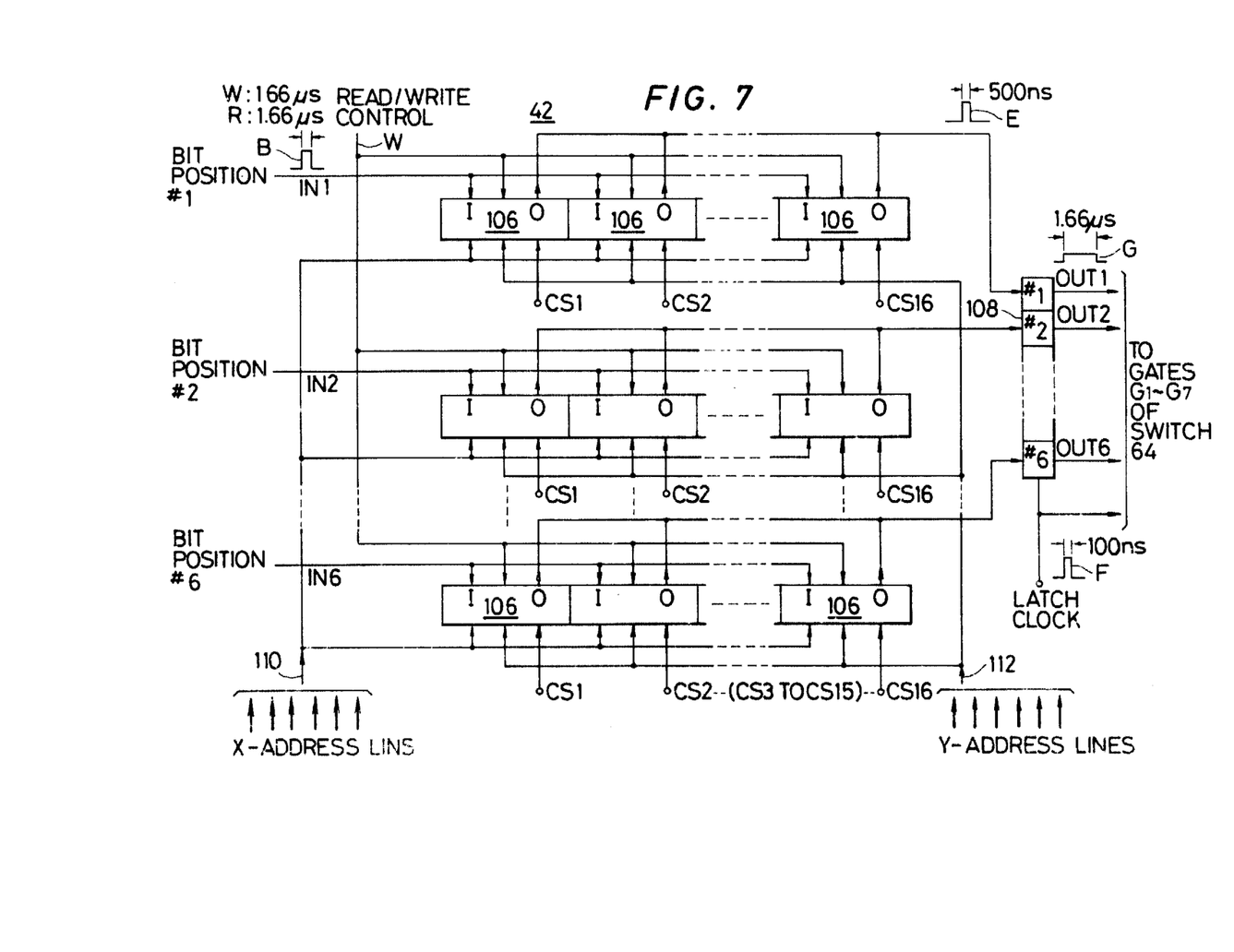
FIG. 7 shows the details of a random access memory of FIG. 6.

FIG. 6 shows the details of the input and output switching circuits 40 and 64 and random access memory units 42 of the lane unit 18. As shown the input switching circuit 40 comprises typically three gate units 40-1, 40-2 and 40-3 (unit 40-2 being omitted for simplicity) each comprising gates G1 to G6 for transmission of the six-bit parallel routing information from the PCM encoder 44 to input terminals IN1 to IN6 of the corresponding memory unit 42 and a gate G7 for transmission of the write-enable signal from the roadside unit 14 to an input terminal W of the memory unit. The output switching circuit 64 comprises similarly three gate units 64-1, 64-2 and 64-3 (unit 64-2 being omitted for simplicity) each comprising gates G1 to G6 connected to receive the six-bit parallel routing information delivered from output terminal OUT 1 to OUT 6 of the corresponding memory unit 42 and transmit them to the parallel-serial converter 56 and a gate G7 connected to output terminal LA for transmitting a latch signal to the converter 56. Each memory unit 42 operates in the write-in mode in response to the application of a write-enable signal by erasing the previously stored information, and is permitted to operate in the read-out mode in the absence of the write-enable signal. Each memory unit is provided with a plurality of X and Y access terminals and clock terminals CS through which access signals are supplied from the RAM driver 46. As illustrated in FIG. 7 each memory unit 42 comprises a plurality of random access memory IC chips 106 arranged in an array of six rows and sixteen columns. Each memory chip is also an array of $2^{12}$ memory cells so that each row comprises a memory unit of $2^{16}$ memory cells. The data input terminals I of the memory chips 106 of the same row are connected in common to the corresponding input terminal IN and the data output terminals O of the chips are connected in common to the corresponding bit position of a latching circuit 108. The write-enable terminal W is connected to all of the write enable terminals of the memory array so that the whole unit 42 is simultaneously switched to the write or read mode. Each memory chip 106 is comprised of an X address decoder (not shown) having six input address lines represented by a single line 110 connected to the driver 46 and a Y address decoder (not shown) likewise having six input address lines represented by a line 112 connected to the driver 46 so that the storage cells are selected in sequence. A chip selected terminal CS is provided which supplies clock pulses to a selected one of the chips 106 arranged in a row. The X and Y address lines of all the chips are connected in parallel, while the chip select terminals CS of the chips arranged to belong to the same column are also connected in parallel. With these arrangements, the memory cells of each unit 42 are addressed in parallel timed relation from the left to the right of FIG. 7.

Figure 8:
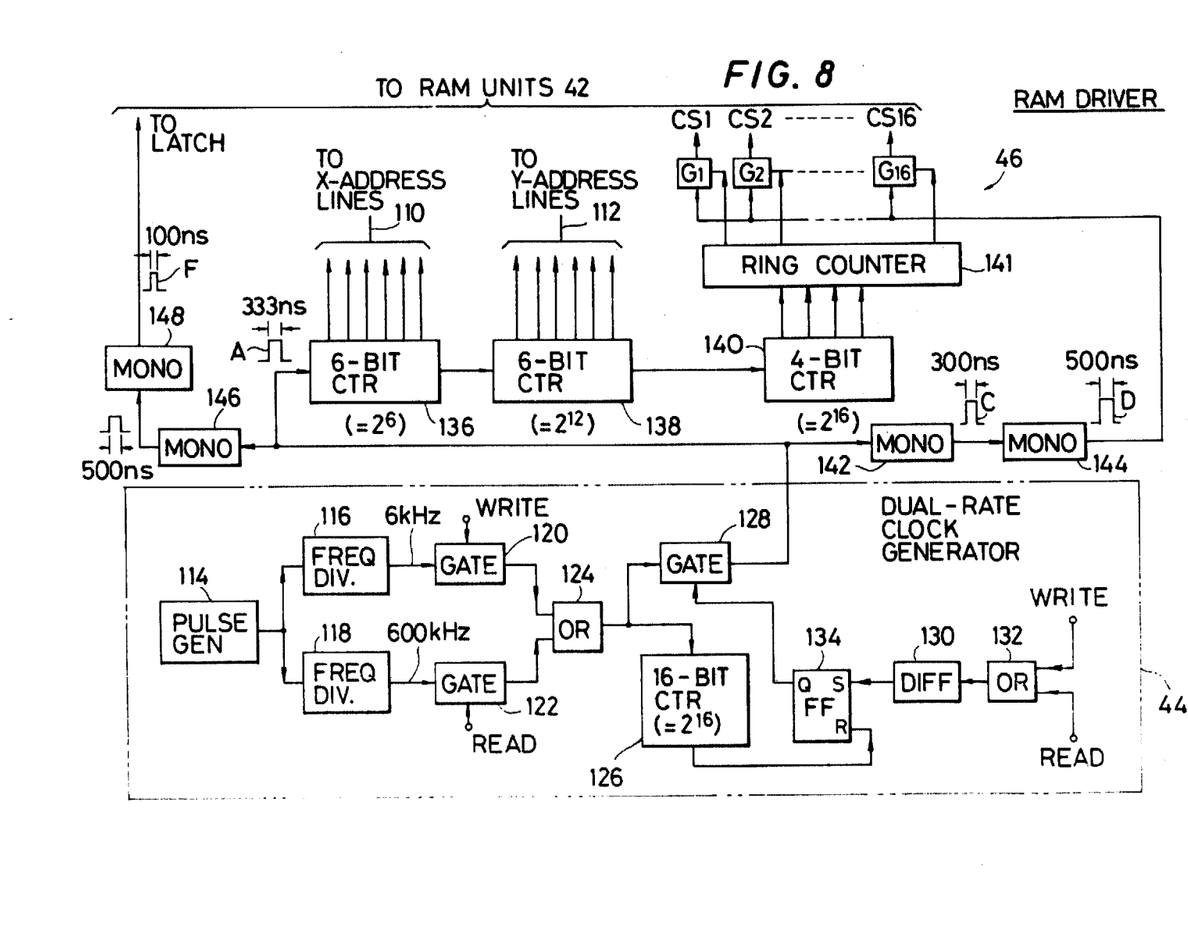
FIG. 8 shows the details of a RAM driver and a clock source of FIG. 2.

FIG. 8 depicts the details of the random access memory driver 46 and the dual-rate clock generator 44. The latter comprises a pulse generator 114 providing pulses at 3 MHz which are divided in frequency by means of a first frequency divider 116 and a second frequency divider 118 so that the frequencies of the outputs from dividers 116 and 118 are 6 kHz and 600 kHz, respectively, which outputs are passed through respectively gates 120 and 122 through an OR gate 124 to a 16-bit binary counter 126 and also to a gate 128. The gate 120 is responsive to the write-in instruction supplied from the roadside unit 14 so that the binary counter 126 is driven by the low frequency clock rate of 6 kHz, and the gate 122 is responsive to the read-out instruction supplied from the microcomputer 62 to drive the counter 126 at the higher clock rate of 600 kHz. The aforesaid write and read instructions are also coupled to a differentiator or monostable multivibrator 130 via OR gate 132 to detect the leading edge of the instruction signals. A flip-flop 134 is switched to a set condition to activate the gate 128 to pass the clock pulses to a 6-bit binary counter 136 of the RAM driver 46 until the flip-flop 134 is reset in response to the output of the counter 126 generated at the count $2^{16}$ input clock pulses. The binary counter 136 of the driver 46 provides a binary count output in response to each input pulse on its six binary representation leads indicated at 110 and also provids a carry signal in response to a count of $2^6$ input pulses to drive a subsequent identical counter 138 which likewise provides a binary count output in response to each input pulse on its six binary representation lead indicated at 112 and generates a carry signal in response to a count $2^{12}$ clock pulses applied to counter 136. The binary outputs of the counters 136 and 138 are connected in parallel to all of the X and Y address decoders of a same RAM unit as described above. The output from the counter 138 is applied to a 4-bit binary counter 140 whose binary representation leads are connected to a ring counter 141 having 16 output leads. In response to each input to the 4-bit counter 140, the ring counter outputs are activated in sequence in the conventional manner to control the activation of gates G1 through G16.

Figure 9:
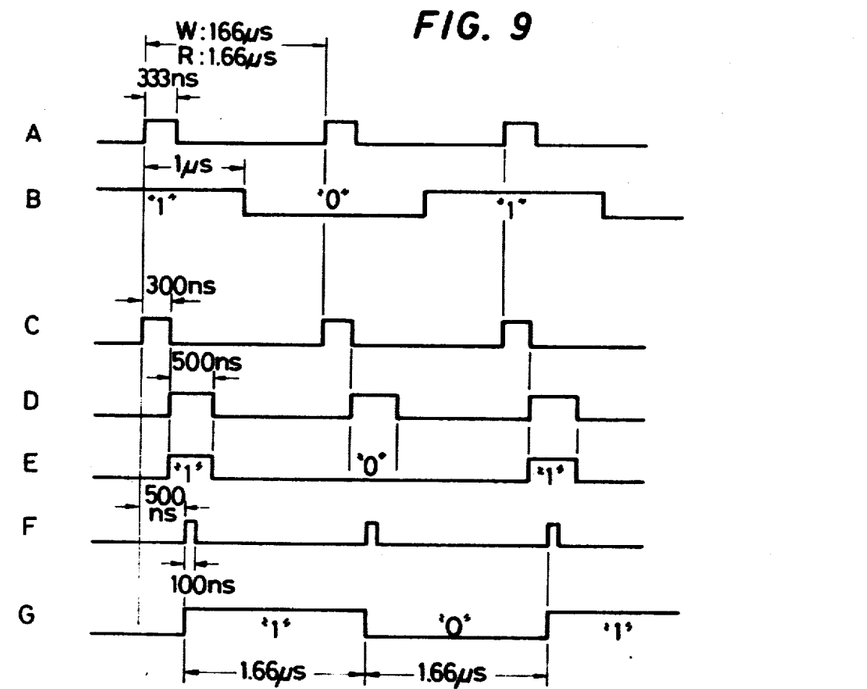
FIGS. 9 and 10 are timing diagrams useful for describing the operation of FIGS. 7 and 8.
Figure 10:
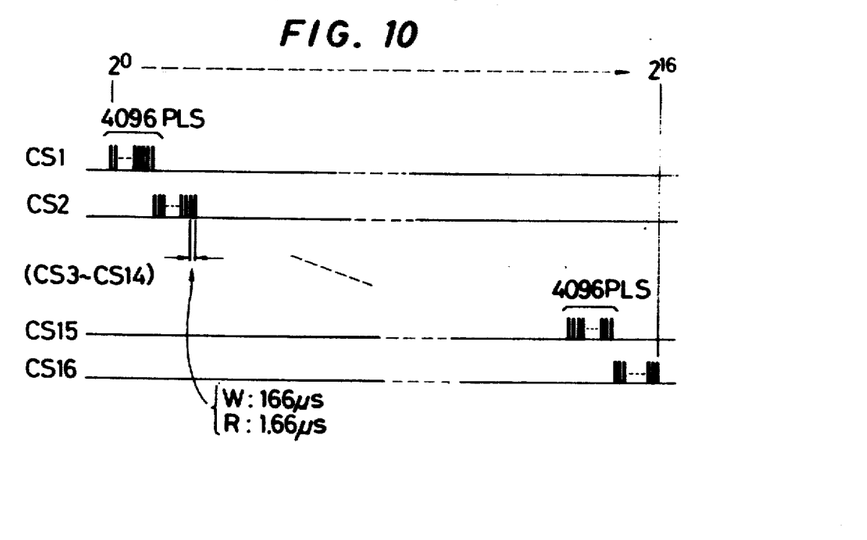

The pulses applied to the 6bit counter 136 are indicated at A in FIG. 9 as having a duration of 333 nanoseconds, which pulses are also applied to a monostable 142 to provide a pulse C of duration of 300 nanoseconds. It is noted that the clock pulse A occurs at the middle of data input pulse B, supplied from the PCM encoder 14 to the RAM unit 42, having a duration of 166 microseconds during writing operations or 1.66 microseconds during reading operations (FIG. 7). A monostable multivibrator 144 is connected to the monostable 142 to generate a pulse D with a duration of 500 nanoseconds at the trailing edge of the 300-nanosecond pulse output of monostable 142. The pulses D are applied to the input terminals of gates G1 through G16 and supplied selectively to the chip select terminals CS1 through CS16 of the respective memory chips 106. It will be seen that the chip select pulses occur simultaneously with the X address pulses A for a duration of 33 nanoseconds so that the addressed memory cell produces an output pulse E with a duration of 500 nanoseconds when the input data is "1" and no output when the latter is "0". The latch 108 is activated by a latch pulse F which is produced by a circuit including a monostable 146 and a monostable 148 connected in series between the input of counter 136 and the latch 108. The monostable 146 provides a pulse with a duration of 500 nanoseconds and the monostable 148 provides a pulse F of 100 nanoseconds at the trailing edge of the 500-nanosecond pulse. As seen from FIG. 9, the latch pulse F occurs at the middle of the data output E and output pulses G with a duration of 1.66 microseconds are delivered in correspondence with the input data B in response to the latch pulse F from the latch 108 in parallel timed relation. It is seen from FIG. 10 that the pulses generated during a single writing or reading operation are applied successively in a sequence of 4096 pulses to each chip select terminal and all the memory chips in a horizontal row are addressed in succession until the $2^{16}$-th pulse is counted in counter 126 at different rates depending on the mode of operation.

Figure 11:
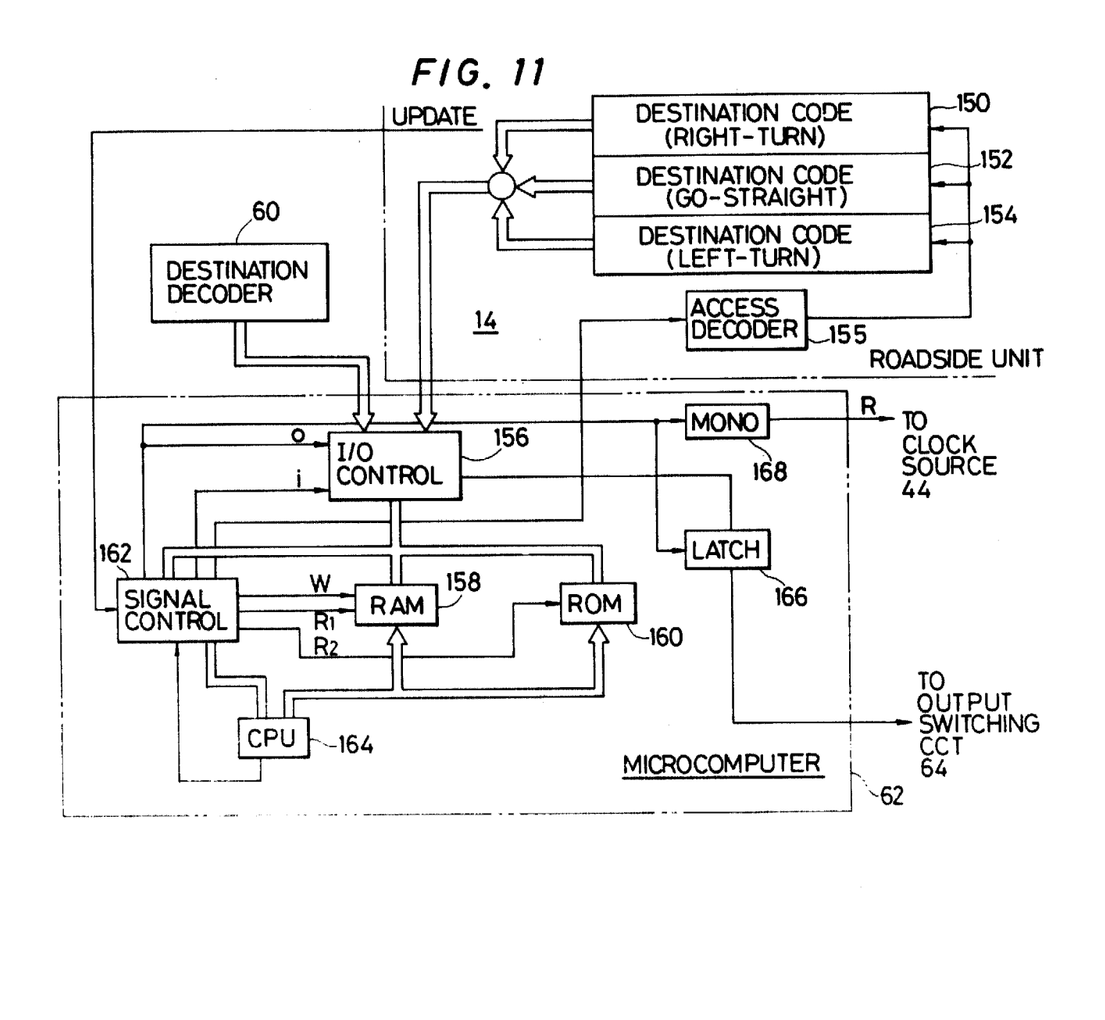
FIG. 11 is a schematic illustration of a microcomputer of FIG. 2 shown interrelated with a storage system of the roadside unit.

FIG. 11 is a schematic illustration of the details of the roadside unit 14 and the microcomputer 62. In the roadside unit 14, the signals received from the district station 12 are stored in memory devices 150, 152 and 154. In the roadside unit 14, the selective information, which had been used in selecting the communication route, has been stored in the form of destination codes in respective storage devices 150, 152 and 154. For example, the destination code stored in device 150 is associated with the routing information indicating a right-turn at the next intersection, the code stored in device 152 is associated with a go-straight instruction and the code stored in device 154 is associated with a left-turn instruction.

The microcomputer 62 is of the INTEL 8008 model and includes an input/output control unit 156, a random access memory 158, a read-only memory 160, a signal control unit 162 and a central processor unit 156. The signal control unit 162 is responsive to an update instruction signal supplied from the roadside unit 14 to instruct an access decoder 155 of the roadside unit to read out the information stored in the storage devices 150, 152 and 154 and to instruct the I/O control unit 156 to pass the information delivered from the roadside unit to the RAM 158 which is also instructed by the signal control unit 162 to write in the delivered information. The update signal is periodically applied to the control unit 162 to update the contents of the RAM 158. ROM 160 is programmed to instruct the I/O control unit 156 to transfer the 15-bit destination code supplied from decoder 60 to RAM 158 in response to a signal R2 supplied from the signal control unit 162. The central processor 164 is instructed by ROM 160 to read out the destination code now stored in RAM 158 and to successively read out the periodically updated destination codes for comparison between them in order to detect coincidence. In this process the RAM 158 is responsive to a signal R1 received from the signal control unit 162 to operate in the reading mode. When coincidence occurs, the storage location of the corresponding destination code is transferred from RAM 158 through I/O control unit 156 to a latch 166 and thence to the output switching circuit 64. Simultaneously, a monostable multivibrator 168 is activated by the signal control unit 162 to generate the read enable signal and applies it to the clock source 44.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A route guidance system for roadway vehicles for conveying thereto aural routing information from a central monitoring station in accordance with monitored traffic data, comprising:

remotely located stations each being connected over a communication channel to said central station and adapted to receive inquiry signals transmitted from a vehicle in a specified area of a roadway and in response to transmit routing information to the same vehicle within the specified area, each of said stations comprising multiple location, addressable storage means for storing at respective different storage locations a plurality of different pieces of routing information received from said central station, means for receiving modulated electromagnetic energy including a destination code signal transmitted from said vehicle, means for demodulating said received electromagnetic energy, means at the remote station and responsive to said destination code for addressing said storage means to select a particular piece of routing information from said storage means, time-compression means for compressing the time dimension of said selected routing information, means for modulating electromagnetic energy with the time-compressed routing information, and means for transmitting the modulated electromagnetic energy to said vehicle; and a vehicle unit comprising means for generating said destination code signal in response to said vehicle entering said specified area, means for modulating electromagnetic energy with said destination code signal, means for transmitting the modulated electromagnetic energy to said remote station for addressing a particular piece of routing information stored at a particular storage location in said remote station, means for receiving the electromagnetic energy transmitted from the remote station, means for demodulated the received electromagnetic energy, time-expansion means responsive to said demodulating means for expanding the time dimension of said demodulated energy to recover said selected piece of routing information, and means for electroacoustically transducing said audio routing information in audible form in said vehicle.

2. A route guidance system as claimed in claim 1, wherein, in said remote station, said time-compression means comprises means for quantizing the aural information received from said central station prior to the storage thereof into said storage means, and wherein, in said vehicle unit, said time-expansion means comprises means for dequantizing the time-expanded information to recover the original aural routing information.

3. A route guidance system as claimed in claim 2, wherein said time-compression means comprises means for causing said quantized information to be retrieved from said storage means at a rate much higher than the rate at which said quantized information is stored in said storage means, and wherein said time-expansion means comprises storage means for successively storing the transmitted quantized information and means for successively retrieving the stored information therefrom at a rate much lower than the rate at which said information has successively been stored.

4. A route guidance system as claimed in claim 3, wherein, in said remote station, the storage means comprises a binary digit storage device having a plurality of storage locations each being allocated for storing different pieces of routing information in the quantized form, input and output channel selection gates respectively connected to the data input and output terminals of said storage device, said input channel selection gate being responsive to the routing information received from said central station to select one of said storage locations and said output channel selection gate being responsive to the destination code received from said vehicle to select one of said storage locations, and means for driving said storage device at a low clock rate in response to the reception of said routing information from said central station to store said quantized information in said storage device and at a high clock rate in response to the reception of said destination code from said vehicle to deliver said stored quantized information from said storage device.

5. A route guidance system as claimed in claim 4, wherein said quantized signal is stored in parallel form.

6. A route guidance system as claimed in claim 5, wherein said quantization means comprises a pulse-code modulation encoding means to represent the analog value of said aural information of a given instant of time in terms of a predetermined number of binary digits, and wherein said binary digits are stored in said storage means in parallel form.

7. A route guidance system as claimed in claim 6, further comprising means for converting the parallel stored binary digits into a series of binary digits and inserting a synchronization pulse for each predetermined number of binary digits prior to the transmission thereof to said vehicle.

8. A route guidance system as claimed in claim 4 wherein said storage device driving means comprises means for decoding the received destination code to determine the location of the stored quantized information for delivery of the desired quantized information.

9. A route guidance system as claimed in claim 1, wherein, in said vehicle unit, said destination code generating means comprises a level detector responsive to the level of electromagnetic field intensity in said specified area exceeding a predetermined level to transmit said destination code.

10. A route guidance system as claimed in claim 9, wherein, in said vehicle unit, further comprising means for introducing a delayed interval in response to the output of said level detector to enable said retrieving means in response to the end of said delayed interval.

11. A route guidance system as claimed in claim 10, further comprising means for producing a preliminary audio sound signal during said delayed interval to alert a vehicle occupant prior to the reproduction of said aural routing information.

12. A route guidance system as claimed in claim 11, wherein said dequantization means comprises a pulsecode modulation decoder.

13. A route guidance system as claimed in claim 12, wherein said time-expansion means comprises means for driving said storage device at a high clock rate in response to the reception of said transmittied quantized information to successively store the same therein and driving the same at a low clock rate after the completion of storage of said information to deliver the stored information to reproduce said aural routing information.

14. A route guidance system as claimed in claim 1, wherein said remotely located station comprises a roadside unit and at least one lane unit connected to the roadside unit, said roadside unit comprising storage means for storing a destination code associated with the routing information received from said central station, and said lane unit comprising storage means for storing said received routing information and means for comparing said destination code received from said vehicle with said destination code stored in said roadside unit to determine correspondence therebetween so as to retrieve desired routing information from the storage means of the lane unit.

15. A route guidance system as claimed in claim 1, wherein said transmitting and receiving means of said remote station comprises a first microwave directive antenna mounted above the roadway surface, and said transmitting and receiving means of said vehicle unit comprises a second microwave directive antenna mounted on said vehicle to constitute a face-to-face relation with said first antenna when said vehicle is in said specified area.

16. A remotely controlled device adapted to be located in use adjacent to a roadside and connected in use to a central route guidance station over a communication channel to receive aural routing information from the central station to be transmitted to a moving vehicle requesting aural routing information while said vehicle is within a specified area of a roadway, comprising:

a transmitter for generating electromagnetic energy in the microwave frequency range to direct it through a directive antenna toward the roadway surface;

a receiver connected in use to said antenna for detecting information contained in microwave energy transmitted from a moving vehicle and captured by said antenna, said vehicle transmitted microwave energy including a destination code signal;

means for providing quantization of said aural routing information received from said central station;

storage means including multiple storage locations at said roadside device for storing respectively plural pieces of said quantized information;

storage control means for causing said storage means to successively store the plural pieces of quantized information in respectively different storage locations of said storage means in said roadside device, said storage control means being responsive to said destination code signal at the output of said receiver for addressing said storage means to deliver a piece of stored quantized information corresponding to said location code signal, said storage control means further including means for causing said storage means to successively deliver the addressed piece of stored quantized information at a rate much-higher than the rate at which said piece of quantized information has successively been stored, said transmitter including modulation means for modulating said microwave energy with said delivered piece of quantized information, whereby a specified area of the roadway is irradiated with unmodulated microwave energy in the absence of a vehicle in said specified area and irradiated with modulated microwave energy in the presence of a vehicle in said specified area.

17. In a route guidance system having a central station from which aural routing information is issued and a remotely located roadside station in communication with said central station over a communication channel to receive said routing information, said roadside station including storage means, means for quantizing the received routing information, means for storing different pieces of the routing information respectively in different storage locations of said storage means at said roadside station, means for receiving microwave energy transmitted by a moving vehicle within a specified area of a roadway requesting routing information, said transmitted microwave energy including a destination code signal, said roadside station further including means for addressing said storage locations in response to said received destination code signal to generate a particular piece of routing information and means for transmitting said particular piece of routing information to the roadway surface in the form of microwave radiation to be received by said moving vehicle, a vehicle unit, comprising:

a transmitter for generating electromagnetic energy in the microwave frequency range to be propagated by a directive antenna mounted on the vehicle;

a receiver at said vehicle responsive to energy received by said antenna for detecting quantized information contained in the microwave radiation transmitted from said roadside station and received by said vehicle antenna;

a detector for detecting when said vehicle enters the specified area of the roadway;

destination code generating means at said vehicle responsive to the output of said detector to generate the destination code, said transmitter including means for modulating said microwave energy with said destination code;

storage means;

storage control means for causing said storage means to successively store the information detected by said receiver and effective after completion of the storage of said information for causing said storage means to successively deliver said stored information at a rate much lower than the rate at which said information has successively been stored; and dequantization means for dequantizing said delivered quantized information to recover the original aural routing information for reproduction through an electroacoustic transducer.

18. A method for conveying aural routing information to a moving vehicle while said vehicle is within a specified location from a central station, comprising the steps of:

(a) transmitting pieces of said aural routing information from said central station to a remotely located station over a communication channel;

(b) storing said pieces of transmitted routing information respectively in different storage locations of a storage device located in said remote station;

(c) generating electromagnetic energy and radiating it toward the roadway surface of said specified location through a first directive antenna mounted fixedly adjacent said specified location;

(d) detecting said radiated energy in said vehicle as it passes through said specified location;
(e) transmitting a destination code signal in the form of electromagnetic energy through a second directive antenna mounted on said vehicle toward said first antenna in response to the detection of said radiated energy in the step of (d);
(f) detecting said destination code at said remote station;
(g) addressing said storage device in response to said destination code signal to generate a particular piece of stored routing information;
(h) transmitting the stored routing information, generated by said addressed storage means, in the form of electromagnetic energy through said first antenna to said second antenna while said vehicle is within the specified location within a smaller interval than the interval within which said aural information is reproduced for human intelligibility;
(i) detecting the particular piece of routing information so transmitted from the first antenna at said vehicle;
(j) successively storing the detected particular piece of routing information in a storage device located in said vehicle;
(k) retrieving the stored particular piece of routing information from said storage device of the vehicle in succession to the completion of the step (j) within a longer interval than the interval within which said detected particular piece of routing information has been stored in the step (j); and
(l) electroacoustically converting the retrieved information into an audible signal.

19. A method as claimed in claim 18, wherein further comprising the step or quantizing the aural routing information prior to the step (b), and the step of dequantizing the retrieved information prior to the step (k).

* * * * *